US012749507B1

(12) United States Patent
Larson et al.

(10) Patent No.: US 12,749,507 B1
(45) Date of Patent: Sep. 29, 2026

(54) MULTI-ACCESS DATA STORAGE DEVICE WITH EQUALIZATION OF DATA RATE

(71) Applicant: WESTERN DIGITAL TECHNOLOGIES, INC., San Jose, CA (US)

(72) Inventors: Andrew Larson, Rochester, MN (US); David R. Hall, Rochester, MN (US); Ali Khalili, Minneapolis, MN (US); Shad H Thorstenson, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 19/248,698

(22) Filed: Jun. 25, 2025

(51) Int. Cl.
*G11B 21/08* (2006.01)
*G11B 27/11* (2006.01)

(52) U.S. Cl.
CPC ............ *G11B 21/083* (2013.01); *G11B 27/11* (2013.01)

(58) Field of Classification Search
None
See application file for complete search history.

(56) References Cited

U.S. PATENT DOCUMENTS 6,121,742 A * 9/2000 Misso .................... G11B 5/553
6,594,104 B2 * 7/2003 Tokuyama ............. G11B 5/486 360/60
6,658,201 B1 12/2003 Rebalski
7,385,781 B1 6/2008 Craig et al.
8,134,798 B1 3/2012 Thelin et al.
8,885,278 B2 * 11/2014 Asakura ............. G11B 5/59627 360/75
9,053,724 B1 * 6/2015 Chahwan ........... G11B 5/59694
9,361,919 B1 6/2016 Lieu et al.
9,837,106 B1 12/2017 Contreras et al.
10,269,385 B1 * 4/2019 French, Jr. ......... G11B 5/59661
10,510,373 B1 * 12/2019 Granz .............. G11B 20/10472
10,629,238 B1 4/2020 Buch et al.
10,685,678 B2 6/2020 Ehrlich
(Continued)

OTHER PUBLICATIONS

Seagate Technology LLC, "MACH.2" Technology Paper, https://www.seagate.com/content/dam/seagate/migrated-assets/www content/solutions/mach-2-multi-actuator-hard-drive/files/tp714-dot-2-2006us-mach-2-technology-paper.pdf, 2020, 11 pages.
(Continued)

*Primary Examiner* — Fred Tzeng
(74) *Attorney, Agent, or Firm* — Calderon Safran & Wright P.C.

(57) ABSTRACT

Various illustrative aspects are directed to a data storage device, method, and one or more processing devices that are configured to perform a read operation by: concurrently reading first data from a first band of tracks on one or more disk surfaces and second data from a second band of tracks on the one or more disk surfaces; and combining the first data and the second data into a digital output of the read operation, wherein the reading the first data comprises moving a first one of two or more selected heads in a first radial direction of the one or more disk surfaces, and wherein the reading the second data comprises moving a second one of the two or more selected heads in a second radial direction of the one or more disk surfaces opposite the first radial direction.

20 Claims, 8 Drawing Sheets

(56) References Cited

U.S. PATENT DOCUMENTS

| | | | | |
|---|---|---|---|---|
| 10,783,036 | B2 | 9/2020 | Swamy | |
| 11,301,164 | B1 | 4/2022 | Markle et al. | |
| 11,862,211 | B1 * | 1/2024 | Hall | G11B 5/09 |
| 11,954,027 | B2 | 4/2024 | Hall et al. | |
| 12,494,225 | B1 * | 12/2025 | Hara | G11B 5/5547 |
| 2006/0064452 | A1 * | 3/2006 | Nakanishi | G06F 17/12 708/607 |
| 2016/0351213 | A1 | 12/2016 | Rudy et al. | |
| 2018/0174613 | A1 | 6/2018 | Zhu et al. | |
| 2018/0226091 | A1 | 8/2018 | Tan et al. | |
| 2020/0020357 | A1 | 1/2020 | Dunn et al. | |
| 2021/0034542 | A1 | 2/2021 | Liu et al. | |
| 2022/0399038 | A1 | 12/2022 | Liu et al. | |
| 2024/0005955 | A1 | 1/2024 | Hall | |

OTHER PUBLICATIONS

International Search Report and Written Opinion in corresponding foreign application PCT/US2025/059899, mailed May 6, 2026, 10 pages.

* cited by examiner

MULTI-ACCESS DATA STORAGE DEVICE WITH EQUALIZATION OF DATA RATE

BACKGROUND

Data storage devices such as disk drives comprise a disk and a head connected to a distal end of an actuator arm, which is rotated about a pivot by a voice coil motor (VCM) to position the head radially over the disk. The disk comprises a plurality of radially-spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $\mathbf{6}_0$-$\mathbf{6}_N$ recorded around the circumference of each servo track. A plurality of concentric data tracks is defined relative to the servo tracks 4, wherein the data tracks may have the same or a different radial density (e.g., tracks per inch (TPI)) than the servo tracks 4. Each servo wedge $\mathbf{6}_i$ comprises a preamble 8 for storing a periodic pattern, which enables proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $\mathbf{6}_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

Various examples disclosed herein provide data storage devices such as hard disk drives with control circuitry configured to perform novel and inventive equalization of data rate in multi-access disk drives. In various examples, control circuitry of this disclosure is inventively configured to move two or more heads in opposite radial directions relative to disk surfaces in a disk drive while the two or more heads are being used to concurrently read data from two or more different tracks in the disk drive in a multi-access read operation that combines the data from the two or more tracks into a single digital output. In this manner, implementations help equalize the read data rate associated with read operations in which multiple heads concurrently read data from multiple tracks in a disk drive. In various examples, control circuitry of this disclosure is further configured to move two or more heads in opposite radial directions relative to disk surfaces in a disk drive while the two or more heads are being used to concurrently write data from two or more different tracks in the disk drive in a multi-access write operation.

On many hard disk drives, the number of data sectors per track is not consistent across the entire disk; instead, it varies with the track's radial location, with more sectors on outer tracks than on inner tracks. This is because outer tracks (e.g., tracks closer to the outer diameter of the disk) are longer than inner tracks (e.g., tracks closer to the inner diameter of the disk) due to having a larger circumference, allowing them to hold more sectors while maintaining a consistent bit density (e.g., bits per inch or BPI). In general, the number of data sectors per track increases as track radial location increases, resulting in the read data rate for outer tracks exceeding the read data rate of inner tracks, sometimes by as much as 2:1. This variation in read data rate is undesirable to users who wish to have a substantially constant read data rate for all the data on a disk.

Various illustrative aspects are directed to a data storage device comprising: one or more disks; two or more actuator mechanisms configured to position two or more selected heads proximate to one or more disk surfaces of the one or more disks; and one or more processing devices. The one or more processing devices, individually or in combination, are configured to perform a read operation by: concurrently reading first data from a first band of tracks on the one or more disk surfaces and second data from a second band of tracks on the one or more disk surfaces; and combining the first data and the second data into a digital output of the read operation, wherein the reading the first data comprises moving a first one of the two or more selected heads in a first radial direction of the one or more disk surfaces, and wherein the reading the second data comprises moving a second one of the two or more selected heads in a second radial direction of the one or more disk surfaces opposite the first radial direction.

Various illustrative aspects are directed to a method comprising: defining bins of tracks for each of different pluralities of tracks on disk surfaces in a disk drive, wherein respective ones of the different pluralities of tracks are associated with respective ones of an odd number of actuator assemblies in the disk drive; defining permutations of respective ones of the bins of tracks; and performing a read operation by concurrently reading data from at least one track in each of the different pluralities of tracks according to one of the permutations, wherein the defining the bins of tracks, the defining the permutations, and the performing the read operation are performed by one or more processing devices individually or in combination.

Various illustrative aspects are directed to one or more processing devices, individually or in combination, comprising: means for performing a read operation in a disk drive by concurrently reading first data from a first band of tracks on one or more disk surfaces using a first head and second data from a second band of tracks on the one or more disk surfaces using a second head; means for moving the first head in a first radial direction of the one or more disk surfaces and the second head in a second radial direction of the one or more disk surfaces opposite the first radial direction during the read operation; and means for combining the first data and the second data into a digital output of the read operation, wherein the one or more disk surfaces are on one or more disks in the disk drive comprising two or more actuator mechanisms.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

DETAILED DESCRIPTION

Figure 1:
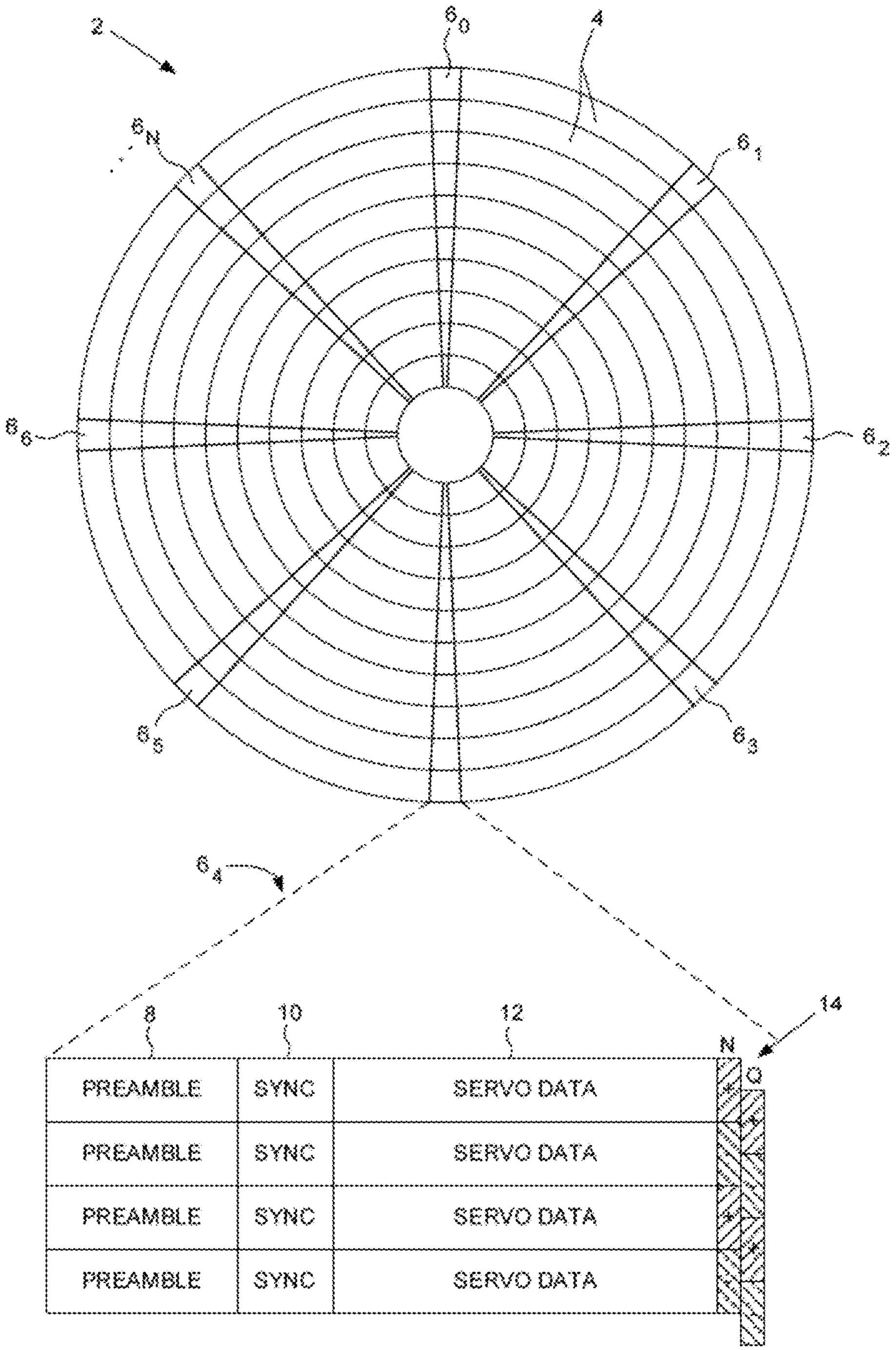
FIG. 1 (Prior Art)
FIG. 1 shows a prior art disk format as comprising a number of radially-spaced, concentric servo tracks defined by servo wedges recorded around the circumference of each servo track.
Figure 2A:
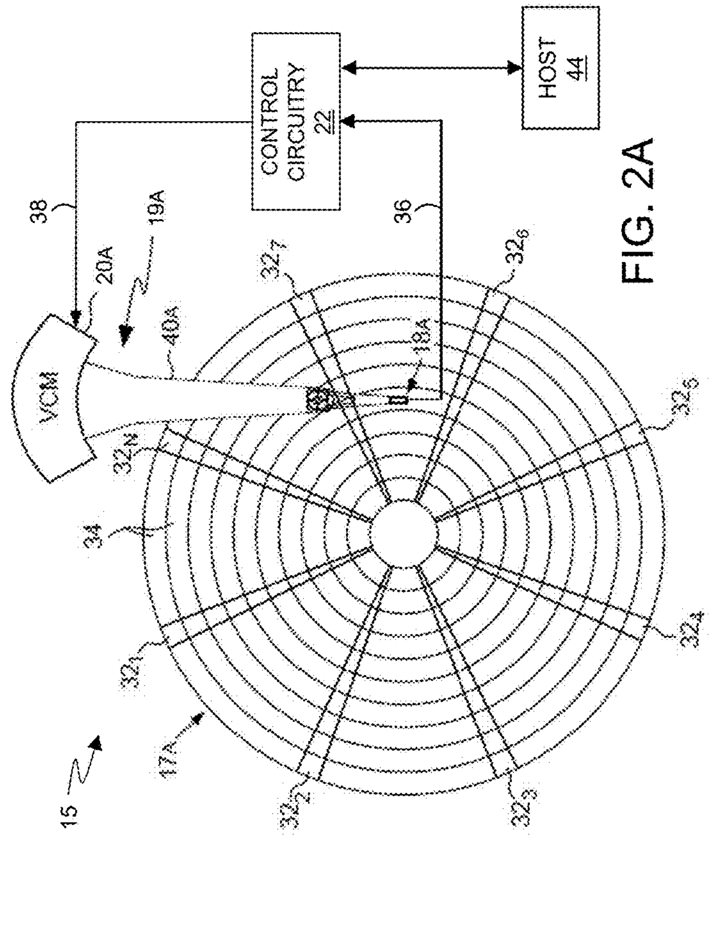
FIGS. 2A and 2B illustrate conceptual block diagrams of a top view and a side view of a data storage device in the form of a disk drive in accordance with aspects of the present disclosure.
Figure 2B:
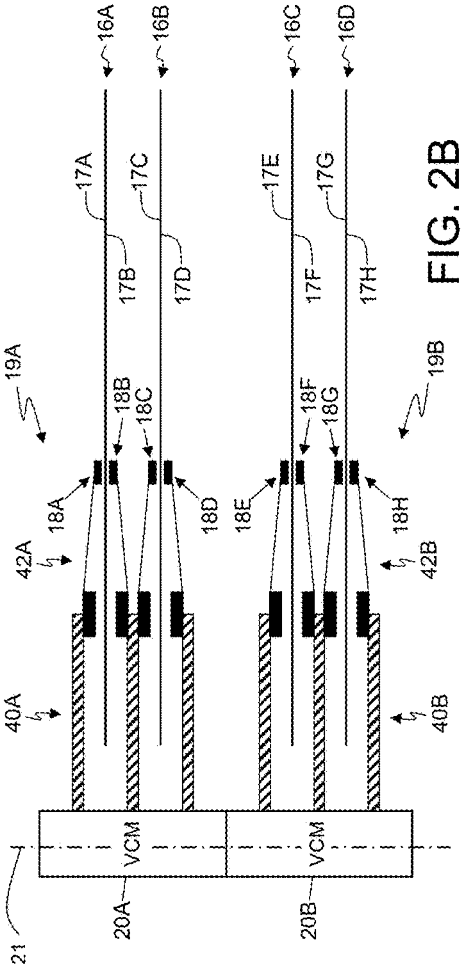

FIGS. 2A and 2B illustrate conceptual block diagrams of a top view and a side view of a data storage device in the form of a disk drive 15, in accordance with aspects of the present disclosure. Disk drive 15 comprises control circuitry 22, multiple actuator assemblies 19A and 19B, and a plurality of hard disks 16A, 16B, 16C, 16D.

In various embodiments, a first plurality of heads 18A, 18B, 18C, 18D are actuated over a first subset of disk surfaces 17A, 17B, 17C, 17D by a first actuator assembly 19A, and a second plurality of heads 18E, 18F, 18G, 18H are actuated over a second subset of disk surfaces 17E, 17F, 17G, 17H by a second actuator assembly 19B. First actuator assembly 19A comprises a primary actuator 20A (e.g., a voice coil motor (VCM)), actuator arms 40A, and suspension assemblies 42A. Actuator arms 40A are configured to suspend heads 18A, 18B, 18C, 18D in close proximity over corresponding disk surfaces 17A, 17B, 17C, 17D, respectively. Suspension assemblies 42A may comprise one or more additional fine actuators, in some examples. Second actuator assembly 19B comprises a primary actuator 20B (e.g., a VCM), actuator arms 40B, and suspension assemblies 42B. Actuator arms 40B are configured to suspend heads 18E, 18F, 18G, 18H in close proximity over corresponding disk surfaces 17E, 17F, 17G, 17H, respectively. Suspension assemblies 42B may comprise one or more additional fine actuators, in some examples.

In the example of FIG. 2B, primary actuators 20A and 20B (which may also be referred to as actuator mechanisms) rotate the respective sets of actuator arms (e.g., 40A and 40B) about a common pivot 21 in what has been referred to as a split actuator design. Control circuitry 22 controls primary actuators 20A and 20B individually (e.g., independently of one another) to rotate in one direction or the other about the common pivot, thereby actuating the respective heads toward the outer diameter or inner diameter of the respective disks, thereby positioning the respective heads at desired locations over the respective disk surfaces for writing data to or reading data from respective ones of the disk surfaces. In another embodiment shown in FIG. 2E, primary actuators 20A and 20B may be configured to actuate respective sets of actuator arms 40A and 40B about separate pivots 21A and 21B, for example, mounted at different circumferential locations about the disks. Other embodiments may employ more than two actuators, such as an embodiment employing more than two actuators actuated about a common pivot or an embodiment employing multiple actuators mounted at different circumferential locations about the disks, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18A-H. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuators (e.g., 20A and 20B) may perform primary, macroscopic actuation of a plurality of actuator arms (e.g., 40A and 40B), each of which may suspend one of the heads 18A-H over and proximate to corresponding disk surfaces 17A-H of hard disks 16A-D. Heads 18A-H are indicated in FIGS. 2A and 2B, although the heads are generally positioned very close to the disk surfaces and are too small to be visible if depicted to scale in FIGS. 2A and 2B.

Example disk drive 15 of FIGS. 2A and 2B comprises four hard disks 16A-D, with two of the four disks associated with respective ones of actuator assemblies 19A and 19B. Other examples may comprise any number of disks per actuator assembly, such as just one disk, two disks, three disks, four or more disks, or ten or eleven or more disks. Hard disks 16A-D may also be known as platters, and their disk surfaces may also be referred to as media, or media surfaces. The four hard disks 16A-D comprise eight disk surfaces 17A-H, with one disk surface on each side of each hard disk, in this illustrative example. Each respective actuator assembly suspends heads of each actuator arm over and proximate to a corresponding disk surface, enabling each of the heads to write control features and data to, and read control features and data from, its respective, proximate disk surface. In this sense, each head of each actuator arm interacts with a corresponding disk surface. As used herein, a head may be said to operate "over" a corresponding disk surface in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $\mathbf{32}_1$-$\mathbf{32}_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $\mathbf{32}_1$-$\mathbf{32}_N$, and to generate a position error signal (PES) representing an error between the actual position of the head and a target position relative to a target track. A servo control system in the control circuitry 22 filters the PES from the servo wedges using a suitable compensation filter to generate a control signal 38 applied to actuator assembly 19A, including to primary actuator 20A, which rotates actuator assembly 19A about an axial pivot in order to perform primary actuation of the head 18A radially over the disk surface 17A in a direction that reduces the PES, as well as to control any fine actuators, in various examples. Control circuitry 22 may also apply control signals to and receive sensor signals from head 18A and/or any of various components of disk drive 15, in various examples.

Figure 2C:
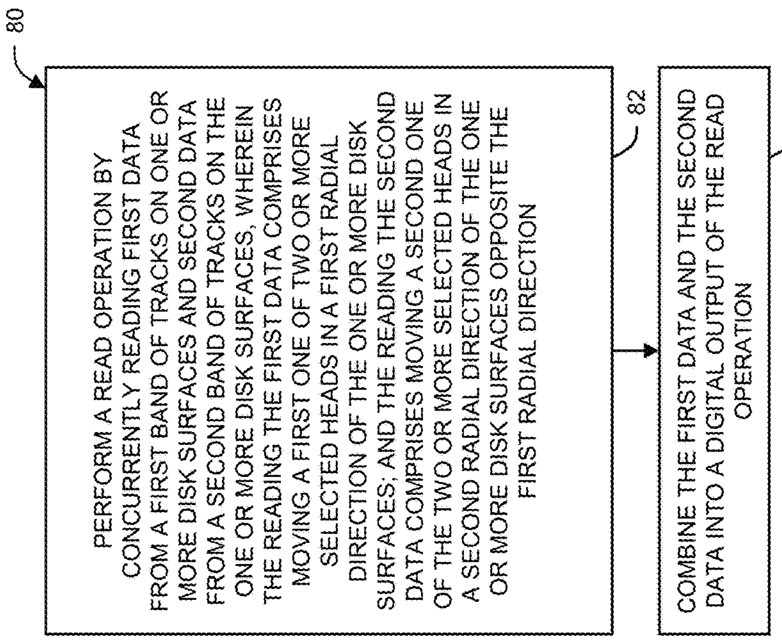
FIG. 2C depicts a flowchart for an example method that control circuitry of a disk drive may perform or execute in controlling the operations of the disk drive in accordance with aspects of the present disclosure.

FIG. 2C depicts a flowchart for an example method 80 that control circuitry 22 may perform or execute in controlling the operations of disk drive 15, in accordance with aspects of the present disclosure, including performing novel and inventive equalization of read data rate in multi-access disk drives. In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, control circuitry 22 may perform a read operation by concurrently reading first data from a first band of tracks on one or more disk surfaces and second data from a second band of tracks on the one or more disk surfaces, wherein the reading the first data comprises moving a first one of two or more selected heads in a first radial direction of the one or more disk surfaces, and wherein the reading the second data comprises moving a second one of the two or more selected heads in a second radial direction of the one or more disk surfaces opposite the first radial direction (82). Control circuitry 22 may further combine the first data and the second data into a digital output of the read operation (84). Control circuitry 22 may further perform additional actions, methods, and techniques, in accordance with various aspects including as further described herein.

Figure 2D:
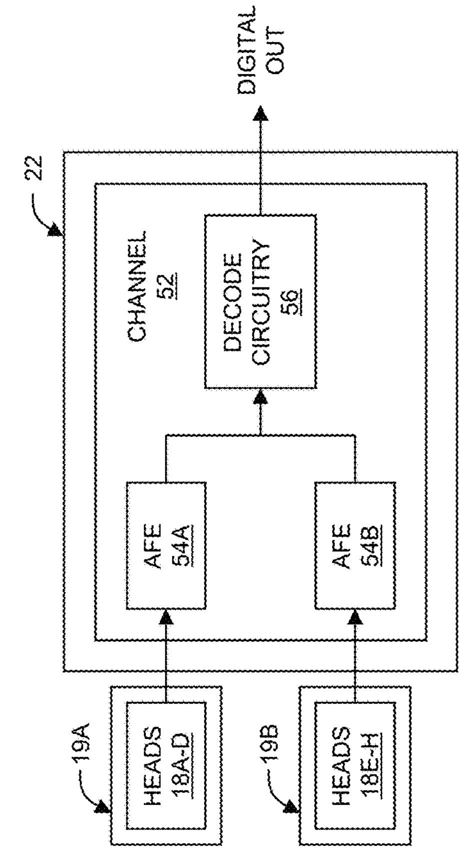
FIG. 2D illustrates a conceptual block diagram of channel circuitry used for decoding data that is read concurrently using respective actuator assemblies in accordance with aspects of the present disclosure.

FIG. 2D illustrates a conceptual block diagram of channel circuitry used for decoding data that is read concurrently using respective actuator assemblies 19A and 19B of FIG. 2B in accordance with aspects of the present disclosure. In various embodiments, control circuitry 22 includes channel 52 (e.g., channel circuitry), which may comprise a read/write channel (also referred to as an input/output (I/O) channel) including one or more specialized circuits configured for processing binary data to be written to respective disk surfaces 17A-H using an analog write signal and processing back into binary data an analog read signal obtained by reading data stored on respective disk surfaces 17A-H. For example, channel 52 may include a write path comprised of various data scramblers, run length limited (RLL) encoders, iterative error correction code (ECC) encoders, pre-compensation circuits, and other data or signal processing components. Channel 52 may include a read path comprised of various amplifiers, filters, equalizers, analog-to-digital converters (ADCs), soft information detectors, iterative ECC decoders, and other data or signal processing components. The write channel components may comprise a write channel circuit, and the read channel components may comprise a read channel circuit, though the circuits may share some components. Channel 52 may provide the analog write signal to and receive the analog read signal from a preamplifier (also called a preamp or preamplifier circuit), which controls and amplifies signals to and from heads. Binary data for recording to the storage medium may be received by channel 52 from controller firmware, and decoded data from channel 52 may be passed to controller firmware and/or directed to memory for communication to a host (e.g., host 44 of FIG. 2A).

In embodiments, channel 52 includes a number of analog front-ends equal to the number of actuator assemblies in disk drive 15. In the example shown in FIGS. 2B and 2D, disk drive 15 includes first and second actuator assemblies 19A and 19B, and channel 52 correspondingly includes first and second analog front-ends 54A and 54B. In the example shown in FIG. 2D, first analog front-end (AFE) 54A is operatively connected to actuator assembly 19A and configured to receive analog read signals from read elements in heads 18A-D, and second analog front-end (AFE) 54B is operatively connected to actuator assembly 19B and configured to receive analog read signals from read elements in heads 18E-H. In embodiments, first and second analog front-ends 54A and 54B are configured to convert the respective analog read signals into respective digitized analog read signals for processing by other components of channel 52. For example, first and second analog front-ends 54A and 54B may each include an ADC that receives an analog read signal from a corresponding read element and that generates a digitized analog read signal prior to decoding. In some configurations, first and second analog front-ends 54A and 54B may each include a timing circuit and one or more filters, equalizers, and/or other signal conditioning components for generating the digitized analog read signal.

In embodiments, a read channel circuit in channel 52 includes decode circuitry 56 that is configured to decode the digitized analog read signals generated by first and second analog front-ends 54A and 54B. In one example, decode circuitry 56 includes an iterative detector that is configured to receive digitized analog read signals and use iterative bit detection and ECC processing to decode the digitized analog read signals into decoded data (e.g., digital data) for further processing by controller firmware and/or communication to a host. In this example, the iterative detector may include one or more bit detectors, such as soft output Viterbi algorithm (SOVA) detectors, and one or more iterative decoders, such as low-density parity check (LDPC) decoders operating on multi-bit encoded symbols to decode each sector of data received by channel 52. Other types of iterative detector may be used.

In embodiments, disk drive 15 is a multi-access disk drive that is configured to read data from multiple tracks of one or more disk surfaces 17A-H simultaneously using multiple read elements to achieve an increased read data rate (also referred to as read throughput) compared to disk drives that read data from only a single track at a time using a single read element. An exemplary implementation of disk drive 15 performs a read operation by utilizing one of heads 18A-D to read data from a first track on one of disk surfaces 17A-D while simultaneously utilizing one of heads 18E-H to read data from a second track on one of disk surfaces 17E-H. In this exemplary implementation, first analog front-end 54A converts the analog read signals generated by the one of heads 18A-D to first digitized analog read signals, second analog front-end 54B converts the analog read signals generated by the one of heads 18E-H to second digitized analog read signals, and decode circuitry 56 decodes the first digitized analog read signals and the second digitized analog read signals and combines the decoded signals into a single, merged digital output of the read operation. Using two heads to concurrently read the data from two tracks in this manner enables higher read data rates (e.g., double) compared to conventional disk drives that read data from only a single track at a time using a single head.

Figure 3:
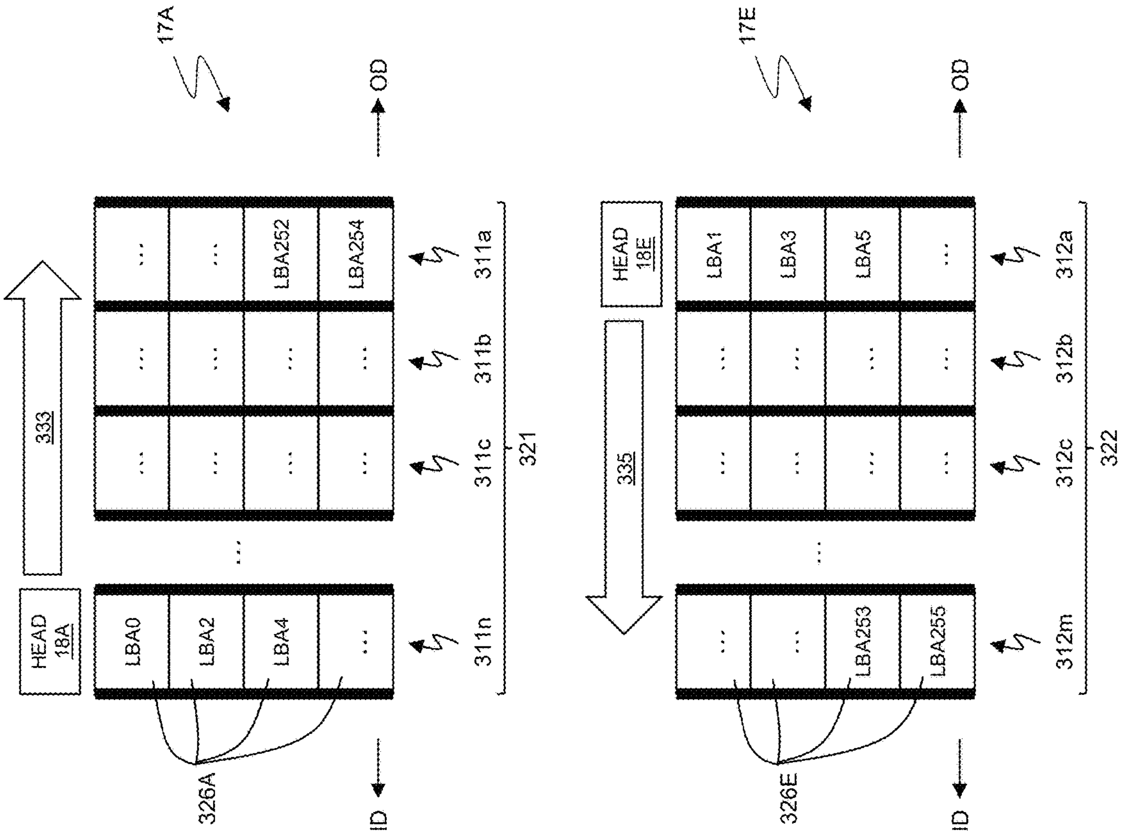
FIG. 3 illustrates a conceptual block diagram of a mapping of portions of tracks on a disk surface to logical block addresses in accordance with aspects of the present disclosure.

FIG. 3 illustrates a conceptual block diagram of a mapping of portions of tracks on a disk surface to logical block addresses (LBAs) in disk drive 15 of FIGS. 2A and 2B in accordance with aspects of the present disclosure. In various embodiments, disk drive 15 includes a logical space having a plurality of LBAs that are mapped to blocks on one or more of disk surfaces 17A-H. Data defining a mapping of LBAs to blocks may be arranged in a logical-physical map that may be stored in control circuitry 22 and used by control circuitry 22 when writing data to, and reading data from, disk surfaces in disk drive 15.

In the example shown in FIG. 3, tracks 311*a-n* are adjacent concentric tracks on disk surface 17A (e.g., on hard disk 16A) and constitute a band 321 on disk surface 17A, with track 311*a* being closer to the outer diameter (OD) of disk surface 17A and track 311*n* being closer to the inner diameter (ID) of disk surface 17A. Each track 311*a-n* includes a plurality of blocks 326A, where each of the blocks 326A has a same size that may correspond to the size of one or more data sectors defined by the formatting of the disk drive. The number "n" may be any number, such that band 321 may include all tracks on disk surface 17A or fewer than all tracks on disk surface 17A.

In the example shown in FIG. 3, tracks 312*a-m* are adjacent concentric tracks on disk surface 17E (e.g., on hard disk 16C) and constitute a band 322 on disk surface 17E, with track 312*a* being closer to the outer diameter (OD) of disk surface 17E and track $\mathbf{312}_m$ being closer to the inner diameter (ID) of disk surface 17E. Each track 312*a-m* includes a plurality of blocks 326E, where each of the blocks 326E has a same size that may correspond to the size of one or more data sectors defined by the formatting of the disk drive. The number "m" may be any number, such that band 322 may include all tracks on disk surface 17E or fewer than all tracks on disk surface 17E.

In accordance with aspects of the present disclosure, and with continued reference to FIG. 3, first successive alternate LBAs (e.g., successive even LBAs such as LBA0, LBA2, LBA4, . . . , LBA254) are mapped to successive blocks 326A in tracks 311*a-n* in increasing order from track 311*n* to track 311*a*, and second successive alternate LBAs (e.g., successive odd LBAs such as LBA1, LBA3, LBA5, . . . , LBA255) are mapped to successive blocks 326E in tracks 312*a-m* in increasing order from track 312*a* to track 312*m*. In embodiments, during a read operation involving LBA range LBA0-LBA255, control circuitry 22 uses the logical-physical map to control head 18A (e.g., via primary actuator 20A) to move in a direction 333 from ID to OD during the read operation and to control head 18E (e.g., via primary actuator 20B) to move in a direction 335 from OD to ID during the same read operation. The directions 333 and 335 may be referred to as radial directions because the heads are travelling from ID to OD or from OD to ID, although the heads do not travel in a straight line over the disk surface(s).

During the read operation in this example, control circuitry 22 uses heads 18A and 18E to concurrently read data (e.g., analog read signals) from successive even LBAs (e.g., LBA0, LBA2, LBA4, etc.) and successive odd LBAs (e.g., LBA1, LBA3, LBA5, etc.), and control circuitry 22 uses channel circuitry to decode this data and output a single merged stream of decoded data corresponding to successive ones of the LBAs (e.g., LBA0, LBA1, LBA2, LBA3, LBA4, LBA5, etc.), e.g., as described with respect to FIG. 2D. In this manner, control circuitry 22 is configured to perform a read operation by: concurrently reading first data from a first band of tracks on one or more disk surfaces and second data from a second band of tracks on the one or more disk surfaces; and combining the first data and the second data into a digital output of the read operation, wherein first LBAs included in the read operation are mapped in the first band of tracks in increasing LBA number order in a first radial direction of the one or more disk surfaces, and wherein second LBAs included in the read operation are mapped in the second band of tracks in increasing LBA number order in a second radial direction of the one or more disk surfaces opposite the first radial direction. In accordance with aspects of the present disclosure, mapping the LBAs in this manner and independently controlling the different heads (e.g., via the different actuator mechanisms) enables performing a read operation by: concurrently reading first data from a first band of tracks on one or more disk surfaces and second data from a second band of tracks on the one or more disk surfaces; and combining the first data and the second data into a digital output of the read operation, wherein the reading the first data comprises moving a first one of two or more selected heads in a first radial direction of the one or more disk surfaces, and wherein the reading the second data comprises moving a second one of the two or more selected heads in a second radial direction of the one or more disk surfaces opposite the first radial direction.

Implementations have been described thus far with respect to read operations. Embodiments in accordance with aspects of the present disclosure are not limited to read operations, however, and may include performing multi-access write operations in the same bands using the same actuator mechanisms, heads, and LBA mapping. In this manner, control circuitry 22 may be further configured to perform a write operation by concurrently writing first write data to the first band of tracks and second write data to the second band of tracks, wherein the writing the first write data comprises moving the first one of the two or more selected heads in the first radial direction, and wherein the writing the second write data comprises moving the second one of the two or more selected heads in the second radial direction. In this manner, control circuitry 22 may be configured to perform a multi-access read operation in the first and second bands and may also be configured to perform a multi-access write operation in the first and second bands.

Figure 4:
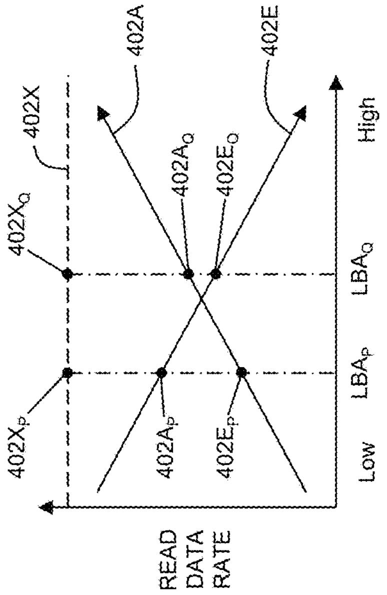
FIG. 4 illustrates an exemplary equalized read data rate in accordance with aspects of the present disclosure.

FIG. 4 illustrates an exemplary equalized read data rate associated with the LBA mapping of FIG. 3 in accordance with aspects of the present disclosure. In FIG. 4, line 402A represents the read data rate of reading data from disk surface 17A as head 18A travels from lower LBAs to higher LBAs, and line 402E represents the read data rate of reading data from disk surface 17E as head 18E travels from lower LBAs to higher LBAs. In embodiments, because the first successive alternate LBAs (e.g., LBA0, LBA2, LBA4, . . . , LBA254) are mapped onto disk surface 17A in increasing order from a track closer to the ID of disk surface 17A (e.g., track 311*n*) to a track closer to the OD of disk surface 17A (e.g., track 311*a*), this causes the read data rate 402A to increase as the LBA number increases due to the head 18A moving in direction 333 from ID toward OD during the read operation. Conversely, because the second successive alternate LBAs (e.g., LBA1, LBA3, LBA5, . . . , LBA255) are mapped onto disk surface 17E in increasing order from a track closer to the OD of disk surface 17E (e.g., track 312*a*) to a track closer to the ID of disk surface 17E (e.g., track 312*m*), this causes the read data rate 402E to decrease as the LBA number increases due to the head 18E moving in direction 335 from OD toward ID during the read operation.

With continued reference to FIG. 4, line 402X represents a combined read data rate when reading data from LBAs 0-255 using head 18A and head 18E with multi-access reading techniques. Point 402$X_P$ represents the combined read data rate of point 402$A_P$ (e.g., the data rate associated with head 18A at $LBA_P$) and point 402$E_P$ (e.g., the data rate associated with head 18E at $LBA_P$). Point 402$X_Q$ represents the combined data rate of point 402$A_Q$ (e.g., the data rate associated with head 18A at $LBA_Q$) and point 402$E_Q$ (e.g., the data rate associated with head 18E at $LBA_Q$). As shown in FIG. 4, the combined read data rate 402X is approximately constant when using heads 18A and 18E to perform multi-access reads of data within the LBA range. In embodiments, due to difference in BPI by head and radius, the combined read data rate 402X is approximately constant. In this manner, implementations of the present disclosure enable approximately constant (e.g., equalized) read data rates across LBA ranges in multi-access disk drives.

Figure 5:
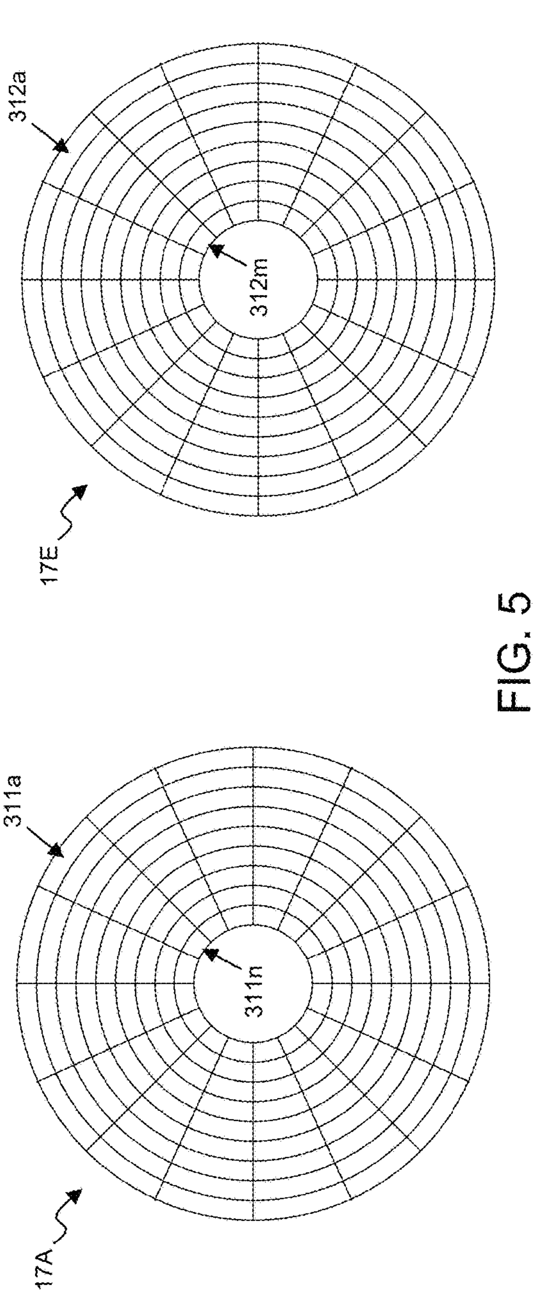
FIG. 5 illustrates a conceptual block diagram of an exemplary configuration of bands on disk surfaces for implementing equalized data rates in accordance with aspects of the present disclosure.

FIG. 5 illustrates a conceptual block diagram of exemplary bands on disk surfaces for implementing equalized data rates in accordance with aspects of the present disclosure. FIG. 5 is described with respect to elements shown in FIG. 3. In the example shown in FIG. 5, track 311*a* is at the OD of disk surface 17A and track 311*n* is at the ID of disk surface 17A, such that band 321 includes all the tracks on disk surface 17A. In the example shown in FIG. 5, track 312*a* is at the OD of disk surface 17A and track 312*m* is at the ID of disk surface 17E, such that band 322 includes all the tracks on disk surface 17E.

Figure 6:
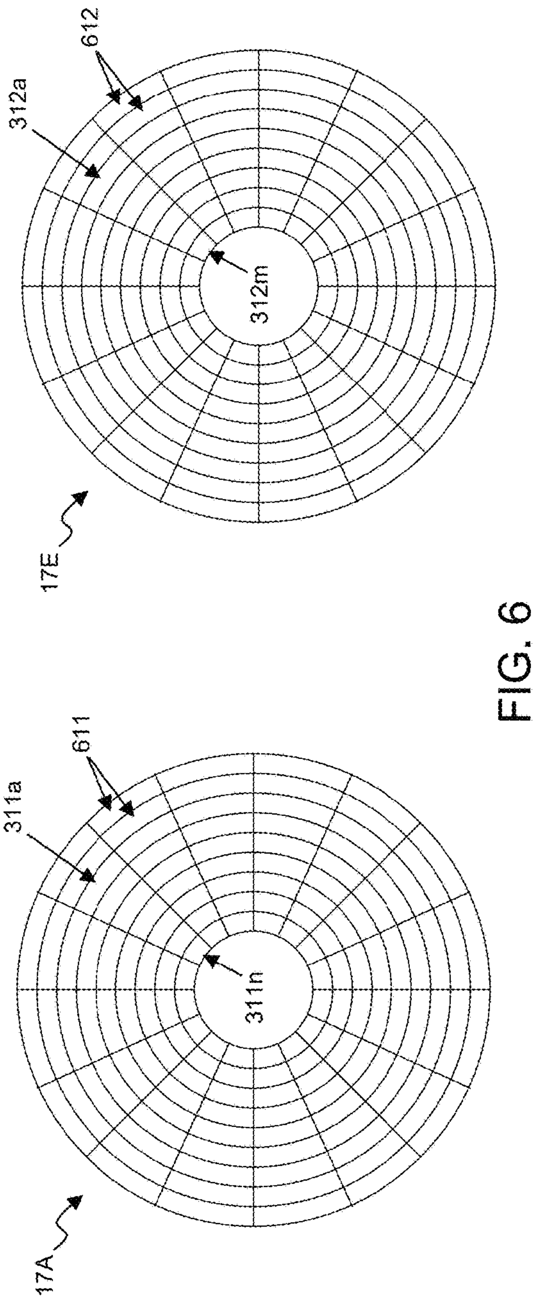
FIG. 6 illustrates a conceptual block diagram of another exemplary configuration of bands on disk surfaces for implementing equalized data rates in accordance with aspects of the present disclosure.

FIG. 6 illustrates a conceptual block diagram of exemplary bands on disk surfaces for implementing equalized data rates in accordance with aspects of the present disclosure. FIG. 6 is described with respect to elements shown in FIG. 3. In the example shown in FIG. 6, track 311*a* is at an intermediate diameter track of disk surface 17A and track 311*n* is at the ID of disk surface 17A, such that band 321 includes fewer than all the tracks on disk surface 17A. In the example shown in FIG. 6, track 312*a* is at an intermediate diameter track of disk surface 17E and track 312*m* is at the ID of disk surface 17E, such that band 322 includes fewer than all the tracks on disk surface 17E. In this example, one or more tracks 611 are between track 311*a* and the OD of disk surface 17A, and one or more tracks 612 are between track 312*a* and the OD of disk surface 17E. In this manner, tracks 311*a-n* constitute a first band on disk surface 17A and tracks 611 constitute a second band on disk surface 17A, while tracks 312*a-m* constitute a first band on disk surface 17E and tracks 612 constitute a second band on disk surface 17E.

In embodiments, and with continued reference to FIG. 6, any number of bands may be defined on disk surfaces (e.g., 17A and 17E) and used for implementing localized (e.g., band-specific) equalized data rates in accordance with methods described herein. For example, a first range of LBAs (e.g., LBAs 0-255) in an LBA space of disk drive 15 may be mapped to respective first bands on disk surfaces 17A and 17E, and a second range of LBAs (e.g., LBAs 256-383) in the LBA space of disk drive 15 may be mapped to respective second bands on disk surfaces 17A and 17E. The mapping of LBAs in each respective set of bands (e.g., a set of first bands and a set of second bands in this example) may be similar to that shown in FIG. 3, e.g., with first successive alternate LBAs (e.g., successive even LBAs) mapped to successive blocks in tracks of a first one of the set of bands in increasing order from an ID to OD direction and second successive alternate LBAs (e.g., successive odd LBAs) mapped to successive blocks in tracks of a second one of the set of bands in increasing order from an OD to ID direction. In this manner each set of bands may be configured to provide an equalized data rate for reads within the set of bands, with different ones of the sets of bands having different equalized data rates due to different radial locations of the different sets of bands. For example, in FIG. 6, a first set of bands that includes tracks 311*a*-311*n* on disk surface 17A and tracks 312*a*-312*m* on disk surface 17E has a first equalized data rate for reads within the first set of bands, and a second set of bands that includes tracks 611 on disk surface 17A and tracks 612 on disk surface 17E has a second equalized data rate for reads within the second set of bands, with the second equalized data rate being greater than the first equalized data rate due to the second set of bands being closer to the OD and the first set of bands being closer to the ID. A user may utilize the configuration shown in FIG. 6, for example, to store first data that requires a relatively lower read throughput at the first set of bands and to store second data that requires a relatively higher read throughput at the second set of bands.

Implementations have been described thus far with respect to a split actuator disk drive having two actuator assemblies (e.g., actuator assemblies 19A and 19B of FIG. 2B). Other implementations of a split actuator disk drive in accordance with aspects of the present disclosure are not limited to two actuator assemblies and instead may include other numbers of actuator assemblies such as three, four, five, six, seven, eight, nine, ten, or eleven or more actuator assemblies. In implementations having an even number of actuator assemblies, an equalized read data rate as described herein may be achieved by scaling by multiples of two. For example, an implementation using four actuator assemblies with a unified LBA space across four hard disks may include first, second, third, and fourth heads that concurrently read data from tracks on first, second, third, and fourth disk surfaces, wherein respective ones of the heads are independently positioned by respective ones of the actuator assemblies, wherein a first set of successive fourth LBAs (e.g., 0, 4, 8, etc.) are mapped on the first disk surface in increasing order (e.g., from lower LBAs to higher LBAs) in an ID to OD direction of the first disk surface, wherein a second set of successive fourth LBAs (e.g., 1, 5, 9, etc.) are mapped on the second disk surface in increasing order in an ID to OD direction of the second disk surface, wherein a third set of successive fourth LBAs (e.g., 2, 6, 10, etc.) are mapped on the third disk surface in increasing order in an OD to ID direction of the third disk surface, and wherein a fourth set of successive fourth LBAs (e.g., 3, 7, 11, etc.) are mapped on the fourth disk surface in increasing order in an OD to ID direction of the fourth disk surface. Similar scaling can be utilized in other implementations having an even number of actuator assemblies. Strategies for implementations having an odd number of actuator assemblies are described in the following figures.

Figure 7:
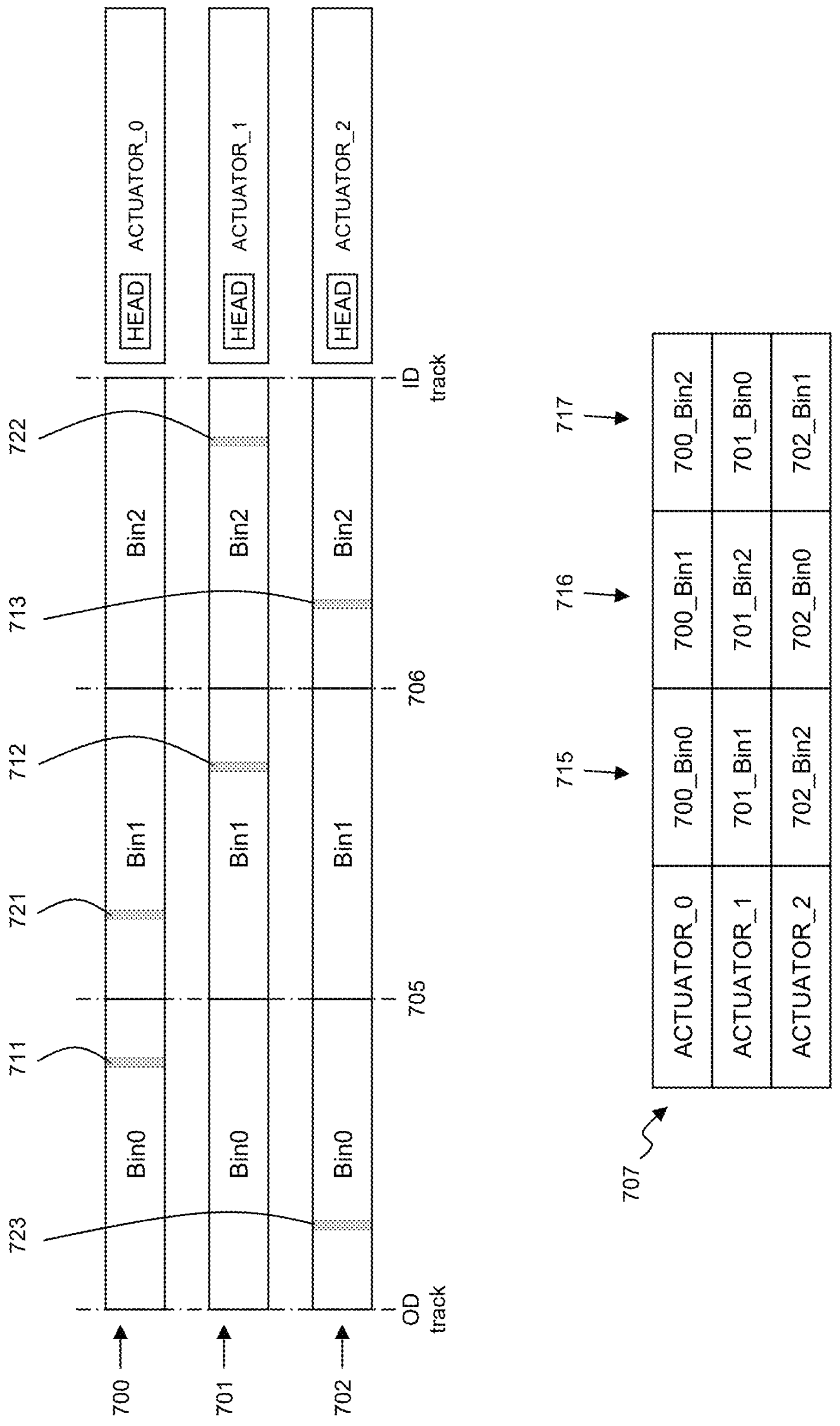
FIG. 7 illustrates a conceptual block diagram of an exemplary methodology for implementing equalized data rates in a split actuator disk drive having three actuator assemblies in accordance with aspects of the present disclosure.

FIG. 7 illustrates a conceptual block diagram of an exemplary methodology for implementing equalized data rates in a variation of split actuator disk drive 15 of FIGS. 2A and 2B having three actuator assemblies in accordance with aspects of the present disclosure.

In FIG. 7, rectangle 700 diagrammatically represents a plurality of tracks (e.g., concentric tracks for recording user data) on a first disk surface of a first hard disk associated with a first actuator assembly (actuator_0), rectangle 701 diagrammatically represents a plurality of tracks on a second disk surface of a second hard disk associated with a second actuator assembly (actuator_1), and rectangle 702 diagrammatically represents a plurality of tracks on a third disk surface of a third hard disk associated with a third actuator assembly (actuator_2). On each disk surface, successive ones of the plurality of tracks are arranged concentrically from an ID track to an OD track. In accordance with aspects of the present disclosure, each of the plurality of tracks is divided into three approximately equal sized bins Bin0, Bin1, and Bin2. For example, Bin0 on each respective disk surface extends from the OD track to a first intermediate diameter track 705 on the disk surface and includes approximately one third of the plurality of tracks on the disk surface, Bin1 on each respective disk surface extends from the first intermediate diameter track 705 to a second intermediate diameter track 706 on the disk surface and includes approximately one third of the plurality of tracks on the disk surface, and Bin2 on each respective disk surface extends from the second intermediate diameter track 706 to the ID track on the disk surface and includes approximately one third of the plurality of tracks on the disk surface. Each of the bins has an average read data rate different than the other bins due to the average track radial location in each bin. For example, Bin0 with an average track radial location closer to the OD may be said to have an average data rate of 2×, Bin1 with an average track radial location closer to a mid-track point of the disk surface may be said to have an average data rate of 1.5×, and Bin2 with an average track radial location closer to the ID may be said to have an average data rate of 1×.

In embodiments, when performing a multi-access read operation (e.g., to concurrently read data from three respective tracks on the first, second, and third disk surfaces), control circuitry (e.g., control circuitry 22) controls the three actuator assemblies (e.g., actuator_0, actuator_1, and actuator_2) to position respective heads over tracks in respective ones of the bins according to matrix 707. In this manner, implementations may be used to provide coarse equalization of read data rate for an LBA space mapped onto the three disk surfaces.

In embodiments, the LBA space is mapped to the three disk surfaces in a manner that logically pairs tracks in respective ones of the bins on the different disk surfaces according to matrix 707 that defines permutations of respective ones of the bins from respective ones of the plurality of tracks (e.g., 700, 701, 702). In embodiments, logically-paired means that successive LBAs in the LBA space are mapped to successive locations in the respective tracks in an alternating manner (e.g., LBAs 0, 3, 6, etc., in a first track, LBAs 1, 4, 7, etc., in a second track, and LBAs 2, 5, 8, etc., in a third track). In embodiments, control circuitry 22 performs a read operation by concurrently reading data from at least one track in each of the different pluralities of tracks according to one of the permutations defined in matrix 707.

In one example configuration, as shown in column 715 of matrix 707, respective tracks in Bin0 of plurality of tracks 700 (e.g., 700_Bin0) are logically paired with respective tracks in Bin1 of plurality of tracks 701 (e.g., 701_Bin1) and respective tracks in Bin2 of plurality of tracks 702 (e.g., 702_Bin2). In this example, as shown in column 716 of matrix 707, respective tracks in Bin1 of plurality of tracks 700 (e.g., 700_Bin1) are logically paired with respective tracks in Bin2 of plurality of tracks 701 (e.g., 701_Bin2) and respective tracks in Bin0 of plurality of tracks 702 (e.g., 702_Bin0). In this example, as shown in column 717 of matrix 707, respective tracks in Bin2 of plurality of tracks 700 (e.g., 700_Bin2) are logically paired with respective tracks in Bin0 of plurality of tracks 701 (e.g., 701_Bin0) and respective tracks in Bin1 of plurality of tracks 702 (e.g., 702_Bin1).

In a particular example shown in FIG. 7, tracks 711, 712, and 713 are logically paired according to column 715 of matrix 707, and tracks 721, 722, and 723 are logically paired according to column 716 of matrix 707. In accordance with aspects of the present disclosure, the combined read data rate when concurrently reading data from tracks 711, 712, and 713 is roughly equivalent to combined read data rate when concurrently reading data from tracks 721, 722, and 723, due to different average read data rates in each of the bins combined with the binning association defined in matrix 707. In this manner, implementations may be used to provide an equalized read data rate for split actuator multi-access disk drives having three actuator assemblies.

Figure 8:
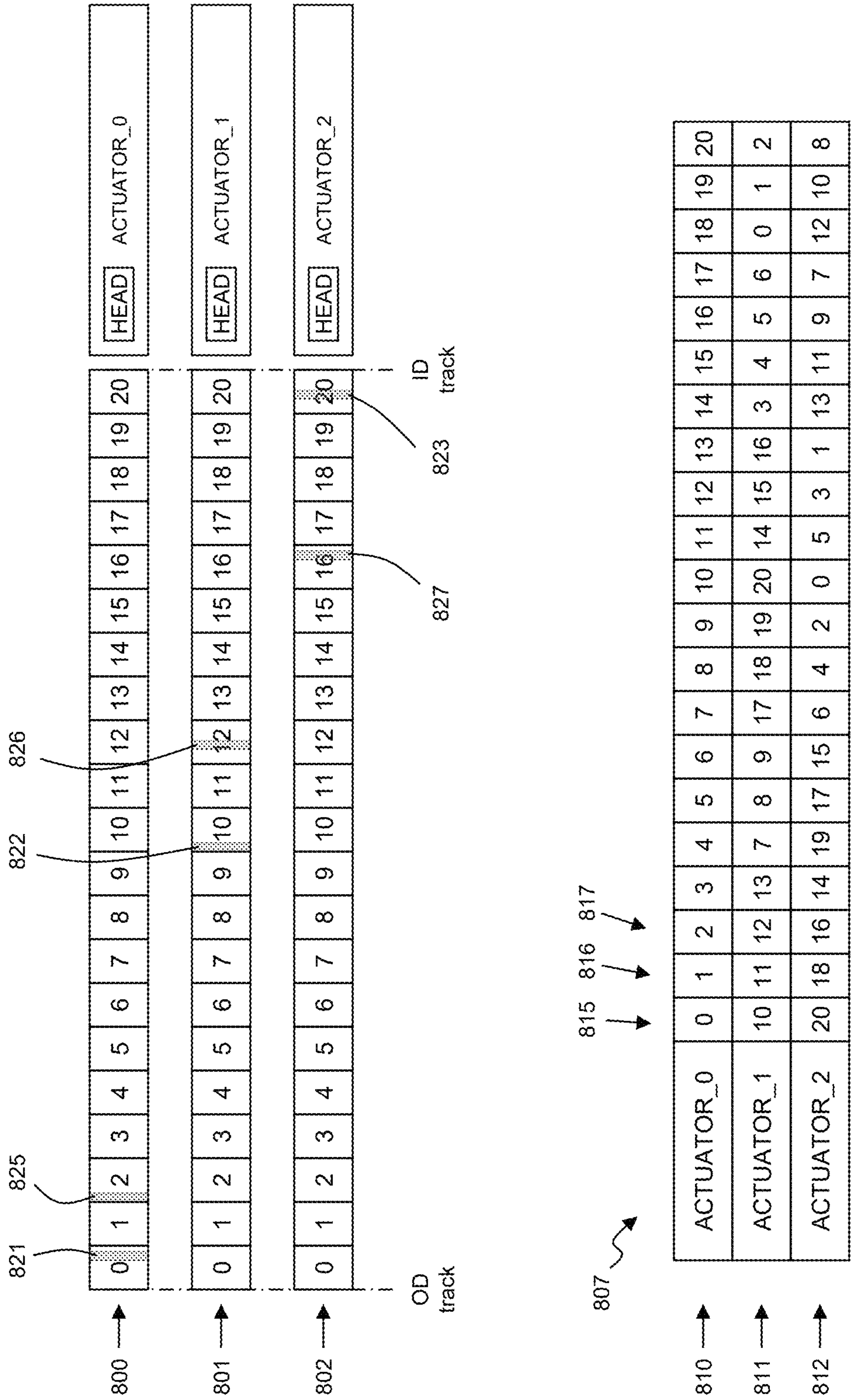
FIG. 8 illustrates a conceptual block diagram of another exemplary methodology for implementing equalized data rates in a split actuator disk drive having three actuator assemblies in accordance with aspects of the present disclosure.

FIG. 8 illustrates a conceptual block diagram of another exemplary methodology for implementing equalized data rates in a variation of split actuator disk drive 15 of FIGS. 2A and 2B having three actuator assemblies in accordance with aspects of the present disclosure.

In FIG. 8, rectangle 800 diagrammatically represents a plurality of tracks (e.g., concentric tracks for recording user data) on a first disk surface of a first hard disk associated with a first actuator assembly (e.g., actuator_0), rectangle 801 diagrammatically represents a plurality of tracks on a second disk surface of a second hard disk associated with a second actuator assembly (e.g., actuator_1), and rectangle 802 diagrammatically represents a plurality of tracks on a third disk surface of a third hard disk associated with a third actuator assembly (e.g., actuator_2). On each disk surface, successive ones of the plurality of tracks are arranged concentrically from an ID track to an OD track. Similar to the embodiment of FIG. 7, in the embodiment of FIG. 8, the plurality of tracks on each disk surface is divided up into equal sized bins. Unlike the embodiment of FIG. 7 in which each plurality of tracks is divided into three approximately equally sized bins, in the embodiment of FIG. 8 each of the plurality of tracks is divided into twenty-one approximately equally sized bins numbered 0-20. Each of the bins 0-20 has an average read data rate different than the other bins due to the average track radial location in each bin. Using a higher number of bins in the embodiment of FIG. 8 provides a finer level of read data rate equalization across the bins compared to the lower number of bins in the embodiment of FIG. 7.

Similar to the embodiment of FIG. 7, in the embodiment of FIG. 8, the LBA space is mapped to the three disk surfaces in a manner that logically pairs tracks in respective ones of the bins on the different disk surfaces according to matrix 807 that defines permutations of respective ones of the bins from respective ones of the plurality of tracks (e.g., 800, 801, 802). Row 810 in matrix 807 indicates bin numbers defined for plurality of tracks 800 associated with actuator_0. Row 811 in matrix 807 indicates bin numbers defined for plurality of tracks 801 associated with actuator_1. Row 812 in matrix 807 indicates bin numbers defined for plurality of tracks 802 associated with actuator_2.

In one example configuration, as shown in column 815 of matrix 807, respective tracks in Bin 0 of plurality of tracks 800 are logically paired with respective tracks in Bin 10 of plurality of tracks 801 and respective tracks in Bin 20 of plurality of tracks 802. In this example, as shown in column 816 of matrix 807, respective tracks in Bin 1 of plurality of tracks 800 are logically paired with respective tracks in Bin 11 of plurality of tracks 801 and respective tracks in Bin 18 of plurality of tracks 802. In this example, as shown in column 817 of matrix 807, respective tracks in Bin 2 of plurality of tracks 800 are logically paired with respective tracks in Bin 12 of plurality of tracks 801 and respective tracks in Bin 16 of plurality of tracks 802.

In a particular example shown in FIG. 8, tracks 821, 822, and 823 are logically paired according to column 815 of matrix 807, and tracks 825, 826, and 827 are logically paired according to column 817 of matrix 807. In accordance with aspects of the present disclosure, the combined read data rate when concurrently reading data from tracks 821, 822, and 823 is approximately equivalent to combined read data rate when concurrently reading data from tracks 825, 826, and 827, due to different average read data rates in each of the bins combined with the binning association defined in matrix 807. The same holds true for each column in matrix 807 due to different average read data rates in each of the bins combined with the binning association defined in matrix 807. In this manner, implementations may be used to provide an equalized read data rate for split actuator multi-access disk drives having three actuator assemblies.

Figure 9:
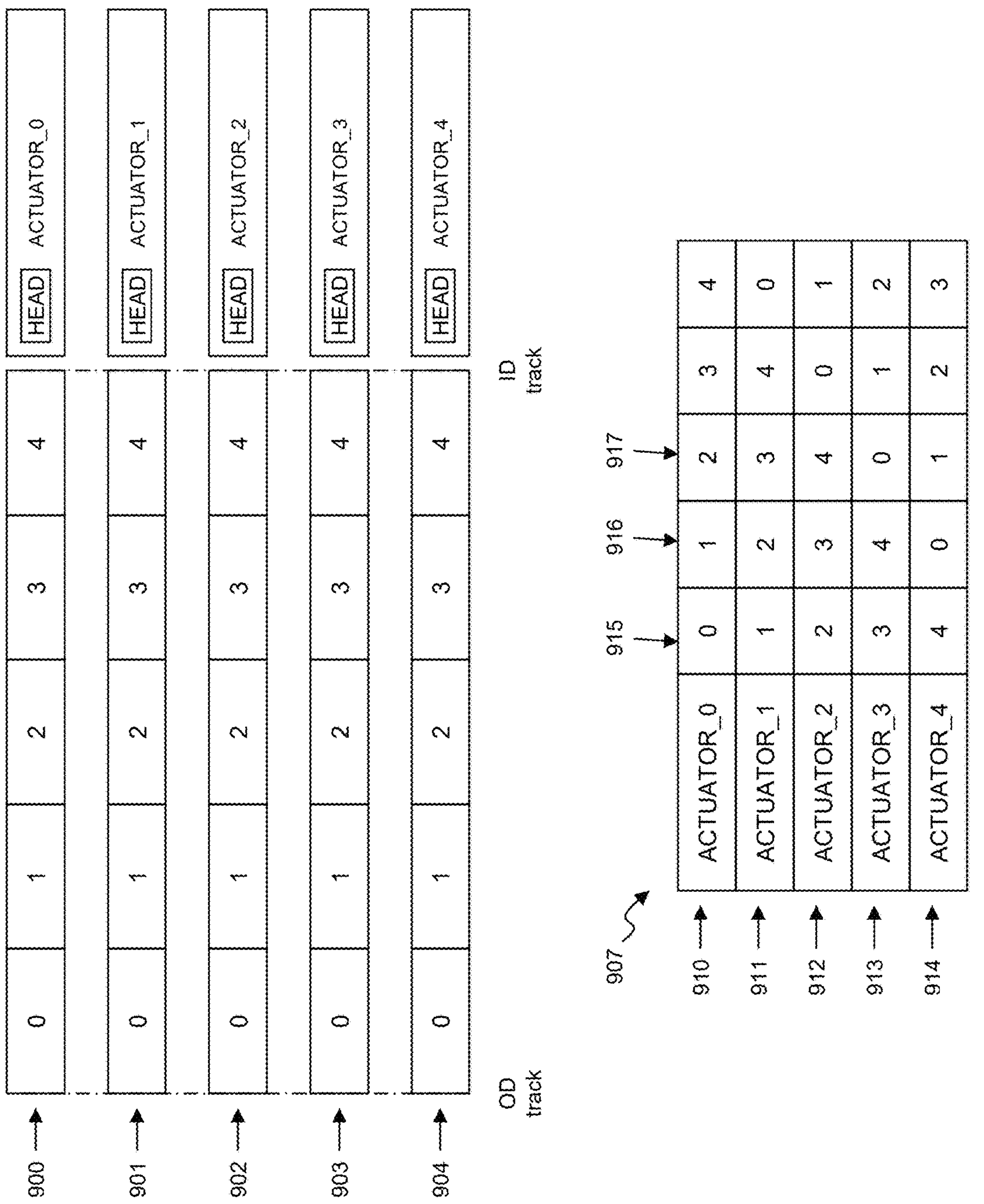
FIG. 9 illustrates a conceptual block diagram of an exemplary methodology for implementing equalized data rates in a split actuator disk drive having five actuator assemblies in accordance with aspects of the present disclosure.

FIG. 9 illustrates a conceptual block diagram of another exemplary methodology for implementing equalized data rates in a variation of split actuator disk drive 15 of FIGS. 2A and 2B having five actuator assemblies in accordance with aspects of the present disclosure.

In FIG. 9, rectangle 900 diagrammatically represents a plurality of tracks (e.g., concentric tracks for recording user data) on a first disk surface of a first hard disk associated with a first actuator assembly (e.g., actuator_0), rectangle 901 diagrammatically represents a plurality of tracks on a second disk surface of a second hard disk associated with a second actuator assembly (e.g., actuator_1), rectangle 902 diagrammatically represents a plurality of tracks on a third disk surface of a third hard disk associated with a third actuator assembly (e.g., actuator_2), rectangle 903 diagrammatically represents a plurality of tracks on a fourth disk surface of a fourth hard disk associated with a fourth actuator assembly (e.g., actuator_3), and rectangle 904 diagrammatically represents a plurality of tracks on a fifth disk surface of a fifth hard disk associated with a fifth actuator assembly (e.g., actuator_4). On each disk surface, successive ones of the plurality of tracks are arranged concentrically from an ID track to an OD track. Similar to the embodiment of FIG. 7, in the embodiment of FIG. 9, the plurality of tracks on each disk surface is divided up into equal sized bins. Unlike the embodiment of FIG. 7 in which each plurality of tracks is divided into three approximately equally sized bins, in the embodiment of FIG. 9, each plurality of tracks is divided into five approximately equally sized bins numbered 0-4. Each of the bins 0-4 has an average read data rate different than the other bins due to the average track radial location in each bin.

In the embodiment of FIG. 9, the LBA space is mapped to the five disk surfaces in a manner that logically pairs tracks in respective ones of the bins on the different disk surfaces according to matrix 907 that defines permutations of respective ones of the bins from respective ones of the plurality of tracks (e.g., 900, 901, 902). Row 910 in matrix 907 indicates bin numbers defined for plurality of tracks 900 associated with actuator_0. Row 911 in matrix 907 indicates bin numbers defined for plurality of tracks 901 associated with actuator_1. Row 912 in matrix 907 indicates bin numbers defined for plurality of tracks 902 associated with actuator_2. Row 913 in matrix 907 indicates bin numbers defined for plurality of tracks 903 associated with actuator_3. Row 914 in matrix 907 indicates bin numbers defined for plurality of tracks 904 associated with actuator_4.

In one example, as shown in column 915 of matrix 907, respective tracks in Bin 0 of plurality of tracks 900 are logically paired with respective tracks in Bin 1 of plurality of tracks 901, respective tracks in Bin 2 of plurality of tracks 902, respective tracks in Bin 3 of plurality of tracks 903, and respective tracks in Bin 4 of plurality of tracks 904. In this example, as shown in column 916 of matrix 907, respective tracks in Bin 1 of plurality of tracks 900 are logically paired with respective tracks in Bin 2 of plurality of tracks 901, respective tracks in Bin 3 of plurality of tracks 902, respective tracks in Bin 4 of plurality of tracks 903, and respective tracks in Bin 0 of plurality of tracks 904. In this example, as shown in column 917 of matrix 907, respective tracks in Bin 2 of plurality of tracks 900 are logically paired with respective tracks in Bin 3 of plurality of tracks 901, respective tracks in Bin 4 of plurality of tracks 902, respective tracks in Bin 0 of plurality of tracks 903, and respective tracks in Bin 1 of plurality of tracks 904.

In accordance with aspects of the present disclosure, the combined read data rate when concurrently reading data from respective tracks in Bin 1 of plurality of tracks 900, Bin 2 of plurality of tracks 901, Bin 3 of plurality of tracks 902, Bin 4 of plurality of tracks 903, and Bin 0 of plurality of tracks 904 (e.g., column 916) is approximately equivalent to the combined read data rate when concurrently reading data from respective tracks in Bin 2 of plurality of tracks 900, Bin 3 of plurality of tracks 901, Bin 4 of plurality of tracks 902, Bin 0 of plurality of tracks 903, and Bin 1 of plurality of tracks 904 (e.g., column 917). The same holds true for each column in matrix 907 due to different average read data rates in each of the bins combined with the binning association defined in matrix 907. In this manner, implementations may be used to provide an equalized read data rate for split actuator multi-access disk drives having five actuator assemblies.

As described with respect to FIGS. 7-9, in implementations where the disk drive 15 has an odd number of actuator assemblies, the novel and inventive equalization of read data rate may be achieved by: defining bins of tracks for each of different pluralities of tracks on disk surfaces in a disk drive, wherein respective ones of the different pluralities of tracks are associated with respective ones of an odd number of actuator assemblies in the disk drive; defining permutations of respective ones of the bins of tracks; and performing a read operation by concurrently reading data from at least one track in each of the different pluralities of tracks according to one of the permutations.

In some embodiments, disk drive 15 may include an odd number (e.g., "2N+1") of actuator assemblies greater than five. In these embodiments, disk drive 15 may utilize an implementation for an even number of the odd number actuator assemblies (e.g., for 2N of the 2N+1 actuator assemblies), and may control the last actuator assembly to move from OD to ID. As the number of actuator assemblies increases (e.g., as N increases), the relative variance in read data rate decreases.

In some embodiments, disk drive 15 may include an odd number (e.g., "2N+3") of actuator assemblies greater than five. In these embodiments, disk drive 15 may utilize an implementation for an even number of the odd number actuator assemblies (e.g., for 2N of the 2N+3 actuator assemblies), and may utilize the 3-bin method (e.g., as shown in FIG. 7 or 8) for the three actuators not included in the even number.

Figure 2E:
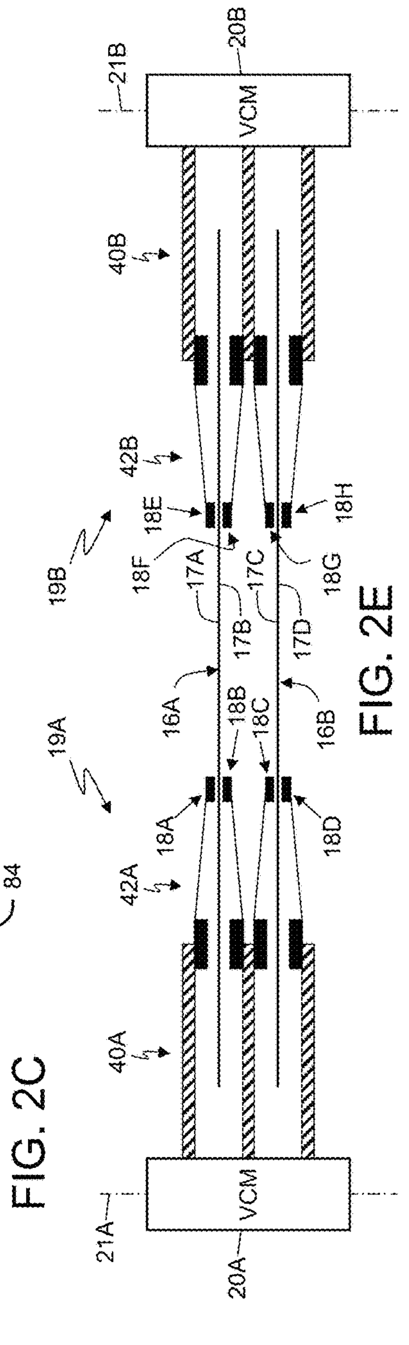
FIG. 2E illustrates a conceptual block diagram of a side view of another embodiment of the data storage device of FIG. 2A in accordance with aspects of the present disclosure.

Implementations have been described thus far with respect to a split actuator disk drive (e.g., as shown in FIG. 2B). Other implementations may utilize similar techniques in a multi-actuator disk drive such as that shown in FIG. 2E. In the embodiments of FIG. 2E, the multi-actuator disk drive includes first actuator assembly 19A that rotates about first pivot 21A and second actuator assembly 19B that rotates about second pivot 21B.

In one example of a multi-actuator embodiment, the mapping of LBAs to first and seconds bands of tracks as described with respect to FIG. 3 may be utilized in the embodiment of FIG. 2E in which the one or more disk surfaces comprise one disk surface (e.g., 17A) on one of the one or more disks (e.g., 16A) and in which the first band of tracks and the second band of tracks are on the one disk surface. In this example, the first band of tracks may extend from an inside diameter track on the one disk surface to a first intermediate diameter track on the one disk surface, and the second band of tracks extends from an inside diameter track on the one disk surface to a second intermediate diameter track on the one disk surface. In this manner, control circuitry 22 may achieve equalized read data rates during a read operation by moving head 18A over the first band of tracks on disk surface 17A in an ID to OD direction concurrently with moving head 18E over the second band of tracks on disk surface 17A in an OD to ID direction.

In another example of a multi-actuator embodiment, the mapping of LBAs to first and second bands of tracks as described with respect to FIG. 3 may be utilized in the embodiment of FIG. 2E in which the one or more disk surfaces comprise a first disk surface (e.g., 17A) on one of the one or more disks (e.g., 16A) and a second disk surface (e.g., 17B) on the one of the one or more disks (e.g., 16A), the first band of tracks is on the first disk surface, and the second band of tracks is on the second disk surface. This may be analogous to FIGS. 3, 5, and 6 but with the two disk surfaces (e.g., 17A and 17B) being on a same disk (e.g., 16A) in the multi-actuator embodiment of FIG. 2E.

In another example of a multi-actuator embodiment, the mapping of LBAs to first and second bands of tracks as described with respect to FIG. 3 may be utilized in the embodiment of FIG. 2E in which the one or more disk surfaces comprise a first disk surface (e.g., 17A) on one of the one or more disks (e.g., 16A) and a second disk surface (e.g. 17C) on the one of the one or more disks (e.g., 16B), the first band of tracks is on the first disk surface, and the second band of tracks is on the second disk surface. This may be analogous to FIGS. 3, 5, and 6 but with the two disk surfaces (e.g., 17A and 17C) being on two different disks (e.g., 16A and 16B) in the multi-actuator embodiment of FIG. 2E.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations fall within the scope of this disclosure. Certain method, event, or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions, and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a central processing unit (CPU), a field-programmable gate array (FPGA), an SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B, and C" is intended to mean "either A, B, C, or any combination of A, B, and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:

one or more disks;

two or more actuator mechanisms configured to position two or more selected heads proximate to one or more disk surfaces of the one or more disks; and one or more processing devices, individually or in combination, configured to perform a read operation by:

concurrently reading first data from a first band of tracks on the one or more disk surfaces and second data from a second band of tracks on the one or more disk surfaces; and combining the first data and the second data into a digital output of the read operation;

wherein the reading the first data comprises moving a first one of the two or more selected heads in a first radial direction of the one or more disk surfaces; and the reading the second data comprises moving a second one of the two or more selected heads in a second radial direction of the one or more disk surfaces opposite the first radial direction.

2. The data storage device of claim 1, wherein:

the one or more disks comprise a first disk and a second disk;

the one or more disk surfaces comprise a first disk surface on the first disk and a second disk surface on the second disk;

the first band of tracks is on the first disk surface; and the second band of tracks is on the second disk surface.

3. The data storage device of claim 2, wherein:

the first band of tracks extends from an inside diameter track on the first disk surface to an outside diameter track on the first disk surface; and the second band of tracks extends from an inside diameter track on the second disk surface to an outside diameter track on the second disk surface.

4. The data storage device of claim 2, wherein:

the first band of tracks extends from an inside diameter track on the first disk surface to an intermediate diameter track on the first disk surface; and the second band of tracks extends from an inside diameter track on the second disk surface to an intermediate diameter track on the second disk surface.

5. The data storage device of claim 1, wherein:

the first radial direction is from an outside diameter toward an inside diameter of the one or more disks; and the second radial direction is from the inside diameter toward the outside diameter of the one or more disks.

6. The data storage device of claim 1, wherein the two or more actuator mechanisms comprise:

a first actuator mechanism configured to rotate a first set of actuator arms about a common pivot; and a second actuator mechanism configured to rotate a second set of actuator arms about the common pivot and independently of the first set of actuator arms.

7. The data storage device of claim 1, wherein the two or more actuator mechanisms comprise:

a first actuator mechanism configured to rotate a first set of actuator arms about a first pivot; and a second actuator mechanism configured to rotate a second set of actuator arms about a second pivot different than the first pivot and independently of the first set of actuator arms.

8. The data storage device of claim 7, wherein:

the one or more disk surfaces comprise one disk surface on one of the one or more disks; and the first band of tracks and the second band of tracks are on the one disk surface.

9. The data storage device of claim 8, wherein:

the first band of tracks extends from an inside diameter track on the one disk surface to a first intermediate diameter track on the one disk surface; and the second band of tracks extends from an inside diameter track on the one disk surface to a second intermediate diameter track on the one disk surface.

10. The data storage device of claim 7, wherein:

the one or more disk surfaces comprise a first disk surface on one of the one or more disks and a second disk surface on the one of the one or more disks;

the first band of tracks is on the first disk surface; and the second band of tracks is on the second disk surface.

11. The data storage device of claim 10, wherein:

the first band of tracks extends from an inside diameter track on the first disk surface to an outside diameter track on the first disk surface; and the second band of tracks extends from an inside diameter track on the second disk surface to an outside diameter track on the second disk surface.

12. The data storage device of claim 10, wherein:

the first band of tracks extends from an inside diameter track on the first disk surface to an intermediate diameter track on the first disk surface; and the second band of tracks extends from an inside diameter track on the second disk surface to an intermediate diameter track on the second disk surface.

13. The data storage device of claim 1, wherein:

first logical block addresses (LBAs) included in the read operation are mapped in the first band of tracks in increasing LBA number in a first radial direction of the one or more disk surfaces; and second LBAs included in the read operation are mapped in the second band of tracks in increasing LBA number in a second radial direction of the one or more disk surfaces opposite the first radial direction.

14. The data storage device of claim 1, wherein:

the one or more processing devices, individually or in combination, are further configured to perform a write operation by concurrently writing first write data to the first band of tracks and second write data to the second band of tracks;

the writing the first write data comprises moving the first one of the two or more selected heads in the first radial direction; and the writing the second write data comprises moving the second one of the two or more selected heads in the second radial direction.

15. A method comprising:

defining bins of tracks for each of different pluralities of tracks on disk surfaces in a disk drive, wherein respective ones of the different pluralities of tracks are associated with respective ones of an odd number of actuator assemblies in the disk drive;

defining permutations of respective ones of the bins of tracks; and performing a read operation by concurrently reading data from at least one track in each of the different pluralities of tracks according to one of the permutations, wherein the defining the bins of tracks, the defining the permutations, and the performing the read operation are performed by one or more processing devices individually or in combination.

16. The method of claim 15, wherein the disk drive comprises a split actuator disk drive.

17. The method of claim 15, wherein the odd number of actuator assemblies in the disk drive comprises three actuator assemblies.

18. The method of claim 15, wherein the odd number of actuator assemblies in the disk drive comprises five actuator assemblies.

19. One or more processing devices, individually or in combination, comprising:

means for performing a read operation in a disk drive by concurrently reading first data from a first band of tracks on one or more disk surfaces using a first head and second data from a second band of tracks on the one or more disk surfaces using a second head;

means for moving the first head in a first radial direction of the one or more disk surfaces and the second head in a second radial direction of the one or more disk surfaces opposite the first radial direction during the read operation; and means for combining the first data and the second data into a digital output of the read operation;

wherein the one or more disk surfaces are on one or more disks in the disk drive comprising two or more actuator mechanisms.

20. The one or more processing devices of claim 19, wherein the one or more processing devices, individually or in combination, further comprise means to perform a write operation by concurrently writing first write data to the first band of tracks and second write data to the second band of tracks while moving the first head in the first radial direction and moving the second head in the second radial direction.

* * * * *